United States Patent [19]

Liu

[11] Patent Number: 5,732,361
[45] Date of Patent: Mar. 24, 1998

[54] ADAPTER FOR MOBILE PHONE

[76] Inventor: Chun-Chieh Liu, No. 14, Lane 155, Mu-Hsin Rd., Sec. 3, Taipei, Taiwan

[21] Appl. No.: 715,629

[22] Filed: Sep. 18, 1996

[51] Int. Cl.$^6$ ........................................... H04Q 7/32
[52] U.S. Cl. ..................... 455/569; 455/575; 455/90; 391/169
[58] Field of Search ................... 455/90, 569, 575, 455/345, 99, 346, 351, 121; 381/168, 169, 188; 379/420, 431

[56] References Cited

U.S. PATENT DOCUMENTS

| | | | |
|---|---|---|---|
| 5,307,401 | 4/1994 | Matsuda | 455/90 |
| 5,615,273 | 3/1997 | Lucey et al. | 381/169 |
| 5,642,402 | 6/1997 | Vilmi et al. | 455/569 |

FOREIGN PATENT DOCUMENTS

| | | | |
|---|---|---|---|
| 94/22234 | 9/1994 | WIPO | 455/121 |

*Primary Examiner*—Chi H. Pham
*Attorney, Agent, or Firm*—Beveridge, DeGrandi Weilacher & Young LLP

[57] ABSTRACT

The present invention relates to an adapter, more particularly, to an improvement to an adapter for mobile phone. The adapter generally comprises an adapter housing, a conducting wires, and a microphone housing. The adapter is further provided with speaker and amplifying circuits. The microphone housing includes a housing and a terminal socket which includes a multi-pin terminals for electrical connection with the signal socket of the mobile phone. When the plug of the adapter housing is inserted into the lighter-socket and the multi-pin terminal is connected with a mobile phone, the mobile phone is powered by the lighter-socket via conducting wires. The driver may readily use the mobile phone through the microphone without holding the handset. Characterized in that the fixture of the microphone housing includes a bottom housing and a fixing housing. The bottom housing is provided with a groove having a holding socket thereof. The holding socket has a cylindrical configuration suitable for install a microphone. The fixing housing has a plate configuration having a cutout boss projected downward corresponding to the holding socket. The cutout boss is provided with an opening for passage of the voice to the microphone. The fixing housing can be attached to the bottom housing in such a manner that the cutout boss of the fixing housing is positioned adjacent to the microphone. Then the fixing housing is attached to the bottom housing by supersonic sealing unit.

1 Claim, 2 Drawing Sheets

5,732,361

ADAPTER FOR MOBILE PHONE

FIELD OF THE INVENTION

The present invention relates to an adapter, more particularly, to an improvement to an adapter for mobile phone. The adapter generally comprises an adapter housing, a conducting wires, and a microphone housing. The adapter housing is provided with a plug which can be inserted into the lighter-socket. The adapter is further provided with speaker and amplifying circuits. The microphone housing includes a housing and a terminal socket which includes a multi-pin terminals for electrical connection with the signal socket of the mobile phone. The microphone housing and the adapter housing are interconnected by conducting wires. When the plug of the adapter housing is inserted into the lighter-socket and the multi-pin terminal is connected with a mobile phone, the mobile phone is powered by the lighter-socket via conducting wires. By the arrangement, the amplifying circuits, the speaker and the microphone construct a circuit loop. The driver may readily use the mobile phone through the microphone without holding the handset. Characterized in that the fixture or the microphone housing includes a bottom housing and a fixing housing. The bottom housing is provided with a groove having a holding socket thereof. The holding socket has a cylindrical configuration suitable for install a microphone. The side wall of the holding socket is provided with a cutout providing a passage for conducting wires. A terminal socket is disposed adjacent to the groove. The terminal socket includes a plurality of parallel ribs spaced from each other and the terminals are neatly arranged thereon. The fixing housing has a plate configuration having a cutout boss projected downward corresponding to the holding socket. The cutout boss is provided with an opening for passage of the voice to the microphone. The fixing housing can be attached to the bottom housing in such a manner that the cutout boss of the fixing housing is positioned adjacent to the microphone. Then the fixing housing is attached to the bottom housing by supersonic sealing unit. Accordingly, the microphone is positioned to receive a better communication signal.

The object of this invention is to provide an improvement to adapter for mobile phone wherein the microphone and the circuits are positioned by supersonic sealing unit, i.e. the bottom housing and the fixing housing are attached by supersonic sealing unit. By this arrangement, the upper and lower cutout boss can be positioned adjacent to the microphone in such a manner that the microphone is fixed without moving and falling off. By this arrangement, an excellent signal transmission is ensured.

In order to achieve the object set forth, the fixture of the microphone includes a bottom housing and a fixing housing. The bottom housing is provided with a groove having a holding socket thereof. The holding socket has a cylindrical configuration suitable for install the microphone. The side wall of the holding is provided with a cutout providing a passage for conducting wires. A terminal socket is disposed adjacent to the groove. The terminal socket includes a plurality of parallel ribs spaced from each other and the terminals are neatly arranged thereon. The fixing housing has a plate configuration having a cutout boss projected downward corresponding to the holding socket. The cutout boss is provided with an opening for passage of the voice to the microphone. The fixing housing can be attached to the bottom housing in such a manner that the cutout boss of the fixing housing is positioned adjacent to the microphone. Then the fixing housing is attached to the bottom housing by supersonic sealing unit. Accordingly, the microphone is positioned to receive a better communication signal. Besides, the wires disposed within the bottom housing are not readily falling off and damaged and the user may directly speak to the fixing housing since the voice can be transmitted to the microphone through the opening provided on the cutout boss.

BRIEF DESCRIPTION OF THE DRAWINGS

In order that the present invention may more readily be understood the following description is given, merely by way of example with reference to the accompanying drawings, in which.

DETAILED DESCRIPTION OF PREFERRED EMBODIMENT

Figure 1:
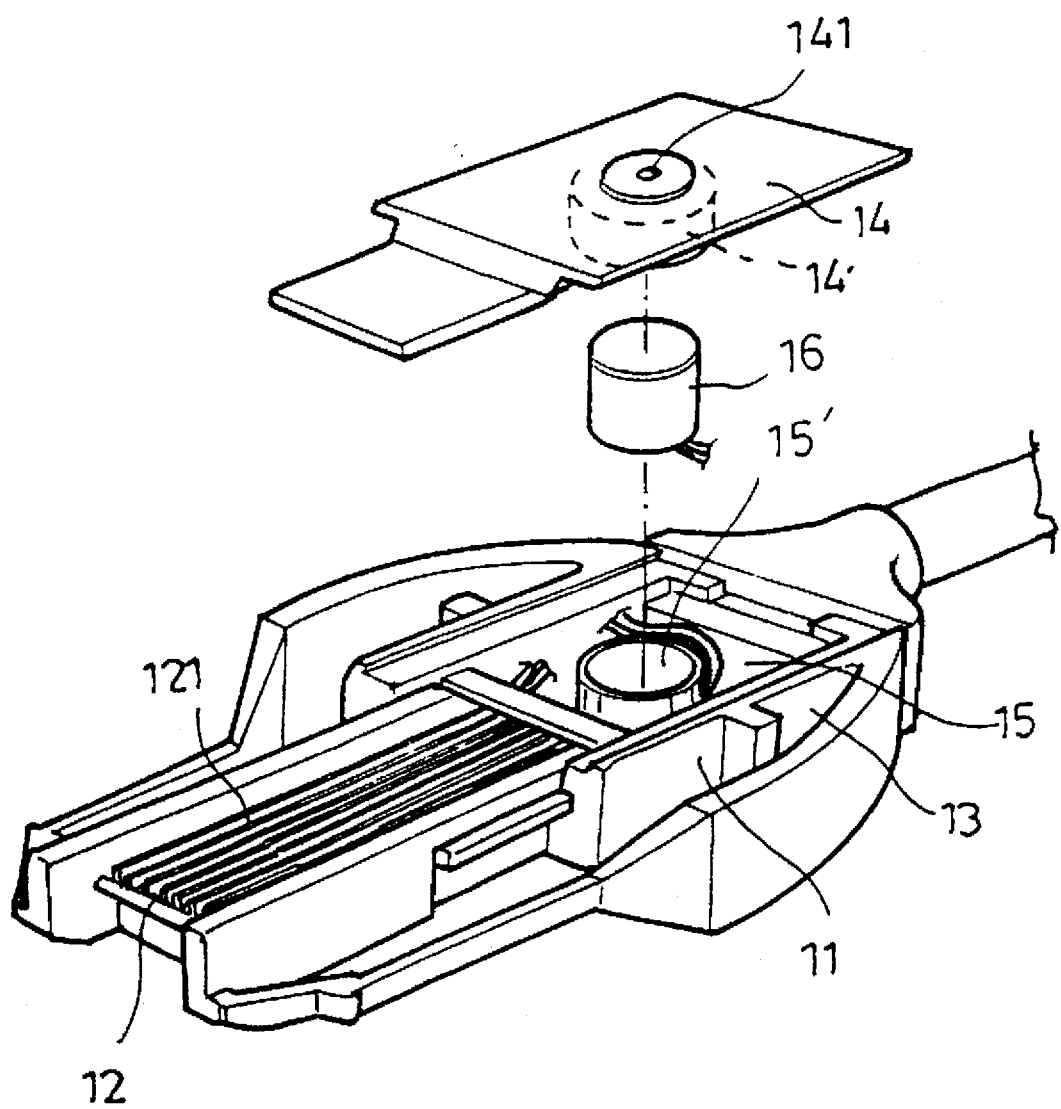
FIG. 1 is an exploded perspective view of an adapter made according to the present invention.
Figure 2:
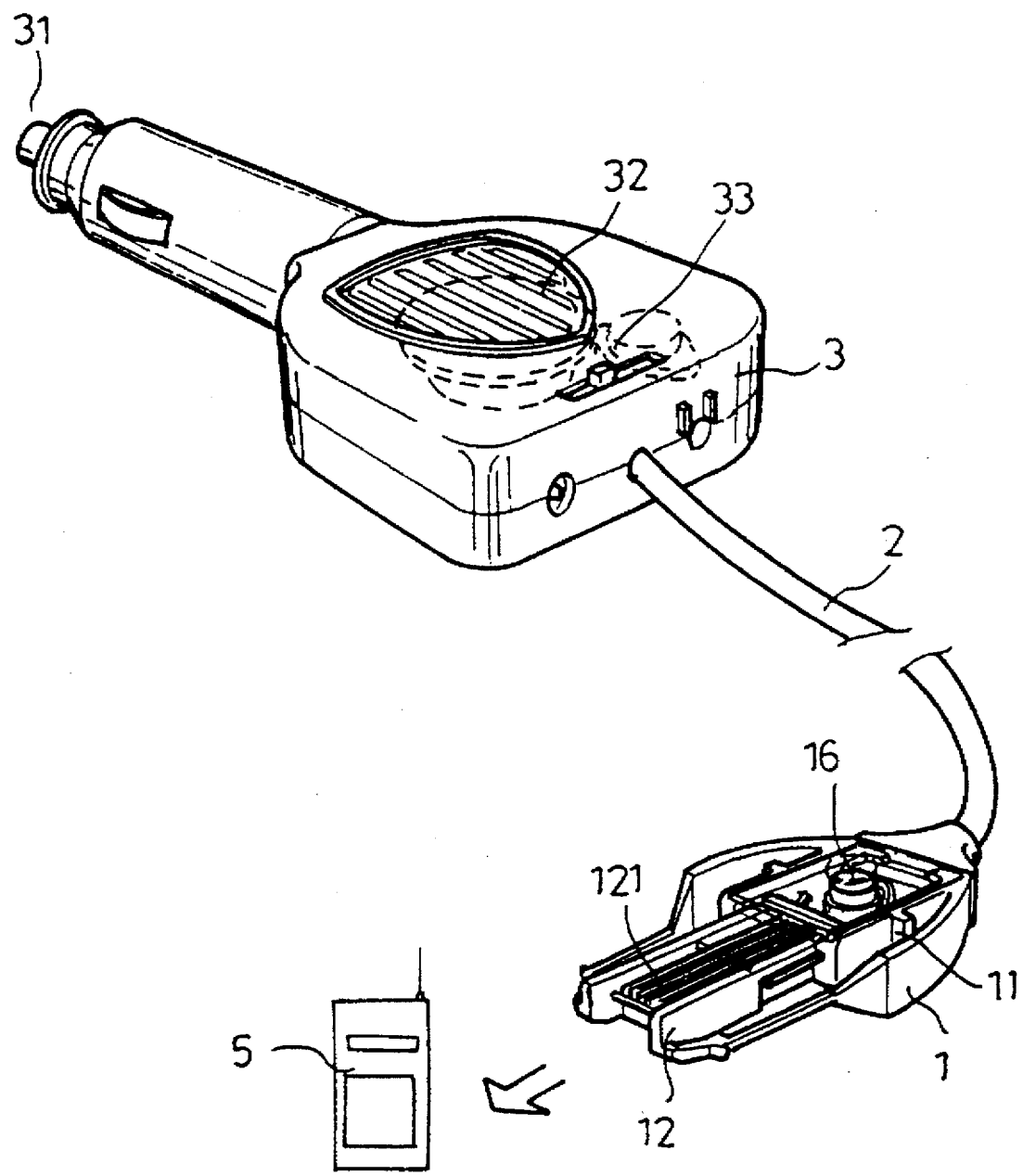
FIG. 2 is still a perspective view showing an assembled adapter made according to this invention.

Referring to FIG. 1, the improvement to an adapter for mobile phone generally comprises a microphone housing 1, a conducting wires 2, and an adapter housing 3. The adapter housing 3 is provided with a plug 31 which can be inserted into the lighter-socket. The adapter 3 is further provided with speaker 32 and amplifying circuits 33. The microphone housing 1 includes a housing 11 and a terminal socket 12 which includes a multi-pin terminals 121 for electrical connection with the signal socket of the mobile phone 5. The microphone housing 1 and the adapter housing 3 are interconnected by conducting wires 2. When the plug 31 of the adapter housing 3 is inserted into the lighter-socket and the multi-pin terminal socket 12 is connected with a mobile phone 5, the mobile phone 5 is powered by the lighter-socket via conducting wires 2. By the arrangement, the amplifying circuits 33 of the adapter housing 3, the speaker 32 and the microphone 16 construct a circuit loop. The driver may readily use the mobile phone through the microphone 16 without holding the handset.

Characterized in that the fixture of the microphone housing 1 includes a bottom housing 13 and a fixing housing 14. The bottom housing 13 is provided with a groove 15 having a holding socket 15' thereof. The holding socket 15' has a cylindrical configuration suitable for install the microphone 16. The side wall of the holding socket 15' is provided with a cutout providing a passage for conducting wires 2. A terminal socket 12 is disposed adjacent to the groove 15. The terminal socket 12 includes a plurality of parallel ribs spaced from each other and the terminals 121 are neatly arranged thereon. The fixing housing 14 has a plate configuration having a cutout boss 14' projected downward corresponding to the holding socket 15'. The cutout boss 14' is provided with an opening 141 for passage of the voice to the microphone 16. The fixing housing 14 can be attached to the bottom housing 13 in such a manner that the cutout boss 14' of the fixing housing 14 is positioned adjacent to the microphone 16. Then the fixing housing 14 is attached to the bottom housing 13 by supersonic sealing unit. Accordingly, the microphone 16 is positioned without readily moving to receive a better communication signal.

While particular embodiment of the present invention has been illustrated and described, it would be obvious to those skilled in the art that various other changes and modifications can be made without departing from the spirit and scope of the invention. It is therefore intended to cover in the appended claims all such changes and modifications that are within the scope of the present invention.

I claim:

1. An improvement to an adapter for a mobile phone of the type generally comprising an adapter housing, conducting wires, and a microphone housing, said adapter housing being provided with a plug which can be inserted into a the lighter-socket, said adapter being further provided with a speaker and amplifying circuits, said microphone housing including a housing and a terminal socket which includes a multi-pin terminals for electrical connection with a signal socket of the mobile phone, said microphone housing and said adapter housing being interconnected by conducting wires, when the plug of the adapter housing is inserted into the lighter-socket and the multi-pin terminal is connected with a mobile phone, the mobile phone is powered by the lighter-socket via said conducting wires, said amplifying circuits, said speaker and said microphone constructing a circuit loop, a driver may readily using the mobile phone through the microphone without holding the mobile phone's handset; characterized in that the microphone housing includes a bottom housing and a fixing housing, said bottom housing being provided with a groove having a holding socket thereof said holding socket having a cylindrical configuration suitable for install a microphone thereof, the side wall of said holding socket being provided with a cutout providing a passage for said conducting wires; said fixing housing having a plate configuration having a cutout boss projected downward corresponding to said holding socket, said cutout boss being provided with an opening for passage of a voice signal to said microphone, said fixing housing being attached to the bottom housing in such a manner that the cutout boss of the fixing housing is positioned adjacent to said microphone, then the fixing housing is attached to the bottom housing by supersonic sealing unit, as a result, said microphone being positioned to receive a better voice signal.

* * * * *